(12) United States Patent
Macheca et al.

(10) Patent No.: US 8,686,841 B2
(45) Date of Patent: Apr. 1, 2014

(54) METHODS AND SYSTEMS RELATED TO ACTIVATING GEO-FENCE BOUNDARIES AND COLLECTING LOCATION DATA

(75) Inventors: Christopher M. Macheca, Centennial, CO (US); Franco Chirico, Highlands Ranch, CO (US); Gerald A. Morgan, Littleton, CO (US); Stanley G. Schwarz, Indialantic, FL (US)

(73) Assignee: **Gordon*Howard Associates, Inc.**, Littleton, CO (US)

( * ) Notice: Subject to any disclaimer, the term of this patent is extended or adjusted under 35 U.S.C. 154(b) by 92 days.

(21) Appl. No.: 13/601,754

(22) Filed: Aug. 31, 2012

(65) Prior Publication Data

US 2013/0238366 A1     Sep. 12, 2013

Related U.S. Application Data

(63) Continuation-in-part of application No. 13/364,573, filed on Feb. 2, 2012, now Pat. No. 8,325,025, which is a continuation of application No. 13/215,732, filed on Aug. 23, 2011, now Pat. No. 8,164,431, which is a continuation of application No. 12/333,904, filed on Dec. 12, 2008, now Pat. No. 8,018,329.

(51) Int. Cl.
*B60R 25/10* (2013.01)

(52) U.S. Cl.
USPC .............. 340/426.19; 340/426.18; 340/6.1; 340/426.1

(58) Field of Classification Search
USPC ............. 340/426.1, 426.2, 426.22, 426.36, 340/426.18, 426.19, 5.72, 686.6, 539.13, 340/5.1, 5.2, 5.61; 705/4; 701/201, 202, 701/207, 213
See application file for complete search history.

(56) References Cited

U.S. PATENT DOCUMENTS

| | | | |
|---|---|---|---|
| 4,335,370 A | 6/1982 | Scalley et al. |
| 4,592,443 A | 6/1986 | Simon |
| 4,624,578 A | 11/1986 | Green |
| 4,688,026 A | 8/1987 | Scribner et al. |
| 4,700,296 A | 10/1987 | Palmer, Jr. et al. |
| 4,738,333 A | 4/1988 | Collier et al. |
| 4,800,590 A | 1/1989 | Vaughan |
| 5,014,206 A | 5/1991 | Scribner et al. |

(Continued)

FOREIGN PATENT DOCUMENTS

| | | |
|---|---|---|
| EP | 1557807 | 7/2005 |
| WO | 9616845 | 6/1996 |

(Continued)

OTHER PUBLICATIONS

US 5,699,633, 10/1999, Roser (withdrawn).

(Continued)

*Primary Examiner* — Toan N Pham
(74) *Attorney, Agent, or Firm* — Mark E. Scott; Michelle N. Safer

(57) ABSTRACT

Activating geo-fence boundaries and collecting location data. At least some of the illustrative embodiments are methods including: activating a geo-fence for a pre-determined area responsive to an event related to a vehicle; receiving Global Positioning System (GPS) signals indicative of a location of the vehicle, the receiving by an onboard device coupled to the vehicle; detecting that the vehicle has crossed the geo-fence; creating a data set comprising data regarding locations of the vehicle with respect to the geo-fence; determining a parameter associated with an existing insurance policy based on the data set.

26 Claims, 4 Drawing Sheets

(56) References Cited

U.S. PATENT DOCUMENTS

| | | |
|---|---|---|
| 5,132,968 A | 7/1992 | Cephus |
| 5,228,083 A | 7/1993 | Lozowick et al. |
| 5,426,415 A | 6/1995 | Prachar et al. |
| 5,490,200 A | 2/1996 | Snyder et al. |
| 5,495,531 A | 2/1996 | Smiedt |
| 5,510,780 A | 4/1996 | Norris et al. |
| 5,619,573 A | 4/1997 | Brinkmeyer et al. |
| 5,673,318 A | 9/1997 | Bellare et al. |
| 5,708,712 A | 1/1998 | Brinkmeyer et al. |
| 5,775,290 A | 7/1998 | Staerzi et al. |
| 5,797,134 A | 8/1998 | McMillan et al. |
| 5,818,725 A | 10/1998 | McNamara et al. |
| 5,819,869 A | 10/1998 | Horton |
| 5,898,391 A | 4/1999 | Jefferies et al. |
| 5,917,405 A | 6/1999 | Joao |
| 5,970,143 A | 10/1999 | Schneier et al. |
| 6,025,774 A | 2/2000 | Forbes |
| 6,026,922 A | 2/2000 | Horton |
| 6,032,258 A | 2/2000 | Godoroja et al. |
| 6,064,970 A | 5/2000 | McMillan et al. |
| 6,088,143 A | 7/2000 | Bang |
| 6,130,621 A | 10/2000 | Weiss |
| 6,157,317 A | 12/2000 | Walker |
| 6,185,307 B1 | 2/2001 | Johnson, Jr. |
| 6,195,648 B1 | 2/2001 | Simon et al. |
| 6,249,217 B1 | 6/2001 | Forbes |
| 6,278,936 B1 | 8/2001 | Jones |
| 6,353,776 B1 | 3/2002 | Rohrl et al. |
| 6,370,649 B1 | 4/2002 | Angelo et al. |
| 6,380,848 B1 | 4/2002 | Weigl et al. |
| 6,401,204 B1 | 6/2002 | Euchner et al. |
| 6,429,773 B1 | 8/2002 | Schuyler |
| 6,489,897 B2 | 12/2002 | Simon |
| 6,587,739 B1 | 7/2003 | Abrams et al. |
| 6,601,175 B1 | 7/2003 | Arnold et al. |
| 6,611,201 B1 | 8/2003 | Bishop et al. |
| 6,611,686 B1 | 8/2003 | Smith et al. |
| 6,615,186 B1 | 9/2003 | Kolls |
| 6,665,613 B2 | 12/2003 | Duvall |
| 6,714,859 B2 | 3/2004 | Jones |
| 6,717,527 B2 | 4/2004 | Simon |
| 6,741,927 B2 | 5/2004 | Jones |
| 6,804,606 B2 | 10/2004 | Jones |
| 6,812,829 B1 | 11/2004 | Flick |
| 6,816,089 B2 | 11/2004 | Flick |
| 6,816,090 B2 | 11/2004 | Teckchandani et al. |
| 6,828,692 B2 | 12/2004 | Simon |
| 6,868,386 B1 | 3/2005 | Henderson et al. |
| 6,870,467 B2 | 3/2005 | Simon |
| 6,873,824 B2 | 3/2005 | Flick |
| 6,888,495 B2 | 5/2005 | Flick |
| 6,917,853 B2 | 7/2005 | Chirnomas |
| 6,924,750 B2 | 8/2005 | Flick |
| 6,950,807 B2 | 9/2005 | Brock |
| 6,952,645 B1 | 10/2005 | Jones |
| 6,961,001 B1 | 11/2005 | Chang et al. |
| 6,972,667 B2 | 12/2005 | Flick |
| 6,985,583 B1 | 1/2006 | Brainard et al. |
| 6,993,658 B1 | 1/2006 | Engberg et al. |
| 7,005,960 B2 | 2/2006 | Flick |
| 7,015,830 B2 | 3/2006 | Flick |
| 7,020,798 B2 | 3/2006 | Meng et al. |
| 7,031,826 B2 | 4/2006 | Flick |
| 7,031,835 B2 | 4/2006 | Flick |
| 7,039,811 B2 | 5/2006 | Ito |
| 7,053,823 B2 | 5/2006 | Cervinka et al. |
| 7,061,137 B2 | 6/2006 | Flick |
| 7,091,822 B2 | 8/2006 | Flick et al. |
| 7,103,368 B2 | 9/2006 | Teshima |
| 7,123,128 B2 | 10/2006 | Mullet et al. |
| 7,124,088 B2 | 10/2006 | Bauer et al. |
| 7,133,685 B2 | 11/2006 | Hose et al. |
| 7,149,623 B2 | 12/2006 | Flick |
| 7,205,679 B2 | 4/2007 | Flick |
| 7,224,083 B2 | 5/2007 | Flick |
| 7,266,507 B2 | 9/2007 | Simon et al. |
| 7,299,890 B2 | 11/2007 | Mobley |
| 7,323,982 B2 | 1/2008 | Staton et al. |
| 7,327,250 B2 | 2/2008 | Harvey |
| 7,379,805 B2 | 5/2008 | Olsen, III et al. |
| 7,389,916 B2 | 6/2008 | Chirnomas |
| 7,561,102 B2 | 7/2009 | Duvall |
| 7,823,681 B2 | 11/2010 | Crespo et al. |
| 7,873,455 B2 | 1/2011 | Arshad et al. |
| 7,877,269 B2 | 1/2011 | Bauer et al. |
| 7,930,211 B2 | 4/2011 | Crolley |
| 8,018,329 B2 | 9/2011 | Morgan et al. |
| 8,095,394 B2 | 1/2012 | Nowak et al. |
| 8,140,358 B1 | 3/2012 | Ling et al. |
| 8,217,772 B2 | 7/2012 | Morgan et al. |
| 8,370,027 B2 | 2/2013 | Pettersson et al. |
| 2001/0040503 A1 | 11/2001 | Bishop |
| 2002/0019055 A1 | 2/2002 | Brown |
| 2002/0193926 A1 | 12/2002 | Katagishi et al. |
| 2003/0036823 A1 | 2/2003 | Mahvi |
| 2003/0151501 A1 | 8/2003 | Teckchandani et al. |
| 2003/0191583 A1 | 10/2003 | Uhlmann et al. |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel et al. |
| 2004/0204795 A1 | 10/2004 | Harvey et al. |
| 2004/0239510 A1 | 12/2004 | Karsten |
| 2005/0017855 A1 | 1/2005 | Harvey |
| 2005/0033483 A1 | 2/2005 | Simon et al. |
| 2005/0134438 A1 | 6/2005 | Simon |
| 2005/0162016 A1 | 7/2005 | Simon |
| 2005/0270178 A1 | 12/2005 | Ioli |
| 2006/0059109 A1 | 3/2006 | Grimes |
| 2006/0108417 A1 | 5/2006 | Simon |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0176771 A1 | 8/2007 | Doyle |
| 2007/0185728 A1 | 8/2007 | Schwarz et al. |
| 2007/0194881 A1 | 8/2007 | Schwarz et al. |
| 2008/0114541 A1 | 5/2008 | Shintani et al. |
| 2008/0162034 A1 | 7/2008 | Breen |
| 2008/0221743 A1 | 9/2008 | Schwarz et al. |
| 2009/0043409 A1 | 2/2009 | Ota |
| 2009/0182216 A1 | 7/2009 | Roushey, III et al. |
| 2010/0148947 A1 | 6/2010 | Morgan et al. |
| 2010/0268402 A1 | 10/2010 | Schwarz et al. |
| 2011/0050407 A1 | 3/2011 | Schoenfeld et al. |
| 2011/0057800 A1 | 3/2011 | Sofer |
| 2011/0084820 A1 | 4/2011 | Walter et al. |

FOREIGN PATENT DOCUMENTS

| | | |
|---|---|---|
| WO | 2007092272 | 8/2007 |
| WO | 2007092287 | 8/2007 |
| WO | 2010/068438 A2 | 6/2010 |

OTHER PUBLICATIONS

Schwarz et al. Office Action dated Aug. 21, 2009; U.S. Appl. No. 11/349,523, filed Feb. 7, 2006, p. 18.

Schwarz et al., Response to Office Action dated Aug. 21, 2009; filed Jan. 21, 2010; U.S. Appl. No. 11/349,523, filed Feb. 7, 2006, 36 p.

Schwarz et al., Final Office Action dated May 4, 2010; U.S. Appl. No. 11/349,523, filed Feb. 7, 2006, 19 p.

Schwarz et al., RCE and Response to Final Office Action dated May 4, 2010, filed Jul. 12, 2010; U.S. Appl. No. 11/349,523, filed Feb. 7, 2006, 40 p.

Schwarz et al., Office Action dated Oct. 26, 2010; U.S. Appl. No. 11/349,523, filed Feb. 7, 2006, 16 p.

Schwarz et al., Response to Office Action dated Oct. 26, 2010, filed Feb. 21, 2011; U.S. Appl. No. 11/349,523, filed Feb. 7, 2006, 27 p.

Schwarz et al., Final Office Action dated Apr. 28, 2011; U.S. Appl. No. 11/349,523, filed Feb. 7, 2006, 17 p.

(56) References Cited

OTHER PUBLICATIONS

Schwarz et al., Preliminary Amendment filed Mar. 16, 2007; U.S. Appl. No. 11/539,292, filed Oct. 6, 2006, 28 p.
Schwarz et al., Office Action dated Jul. 22, 2009; U.S. Appl. No. 11/539,292, filed Oct. 6, 2006, 22 p.
Schwarz et al., Office Action dated May 14, 2010; U.S. Appl. No. 11/539,292, filed Oct. 6, 2006, 13 p.
Schwarz et al., Response to Office Action dated May 14, 2010, filed Jul. 12, 2010; U.S. Appl. No. 11/539,292, filed Oct. 6, 2006, 50 p.
Schwarz et al., Office Action dated Oct. 15, 2010; U.S. Appl. No. 11/539,292, filed Oct. 6, 2006, 13 p.
Schwarz et al., Response to Office Action dated Oct. 15, 2010 filed Feb. 15, 2011; U.S. Appl. No. 11/539,292, filed Oct. 6, 2006, 36 p.
Schwarz et al., Final Office Action dated May 26, 2011; U.S. Appl. No. 11/539,292, filed Oct. 6, 2006, 16 p.
Gordon*Howard Associates, Inc., International Search Report and Written Opinion of the International Searching Authority dated Nov. 29, 2007 in PCT Patent Application No. PCT/US07/02816, 6 p.
Gordon*Howard Associates, Inc., International Search Report and Written Opinion of the International Searching Authority dated Dec. 4, 2007 in PCT Patent Application No. PCT/US07/02840, 6 p.
On Time Payment Protection Systems, printed Jan. 2, 2004 from www.ontime-pps.com/how.html.
Aircept Products, printed Jan. 2, 2004 from www.aircept.com/products.html.
How PayTeck Works, printed Jan. 2, 2004 from www.payteck.cc/aboutpayteck.html.
Article: "Pager Lets You Locate Your Car, Unlock and Start It", published Dec. 10, 1997 in USA Today.
Article: "Electronic Keys Keep Tabs on Late Payers", published Sep. 22, 1997 in Nonprime Auto News.
Article: "PASSTEC Device Safely Prevents Vehicles from Starting", published Jul. 19, 1999 in Used Car News.
Payment Clock Disabler advertisement, published, May 18, 1998.
Secure Your Credit & Secure Your Investment (Pay Teck advertisement), printed Jan. 2, 2004 from www.payteck.cc.
iMetrik Company Information, printed Dec. 21, 2006 from imetrik.com.
About C-CHIP Technologies, printed Dec. 21, 2006 from www.c-chip.com.
Hi-Tech tools to solve traditional problems, printed Dec. 21, 2006 from www.c-chip.com.
C-CHIP Technologies Products: Credit Chip 100, Credit Chip 100C, Credit Chip 200, printed Dec. 21, 2006 from www.c-chip.com.
The Credit Chip 100, printed Dec. 21, 2006 from www.c-chip.com.

METHODS AND SYSTEMS RELATED TO ACTIVATING GEO-FENCE BOUNDARIES AND COLLECTING LOCATION DATA

CROSS-REFERENCE TO RELATED APPLICATIONS

This application is a continuation-in-part of U.S. patent application Ser. No. 13/364,573 for "AUTOMATED GEO-FENCE BOUNDARY CONFIGURATION AND ACTIVATION," filed Feb. 2, 2012, which was a continuation of U.S. patent application Ser. No. 13/215,732 filed Aug. 23, 2011 (now U.S. Pat. No. 8,164,431), which was a continuation of U.S. patent application Ser. No. 12/333,904 filed Dec. 12, 2008 (now U.S. Pat. No. 8,018,329). All related applications are incorporated herein by reference as if reproduced in full below.

BACKGROUND

When determining insurance policy parameters for a driver, an insurance company will consider information including average historical driving habits of drivers within similar geographical locations and having the same demographics. However, considering average historical data may not provide the best snapshot of how an individual driver should be covered under his insurance policy. Therefore, any advancement in providing additional information related to creating an appropriate insurance policy would be valuable.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

"Remote" shall mean one kilometer or more.

"Real-time" shall mean that a location determined by a GPS receiver is sent to a data collection receiver within 5 minutes from the determination by the GPS receiver.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to monitoring the location of a vehicle, activating one or more geo-fences related to the location of the vehicle, and monitoring the location of the vehicle with respect to the geo-fences for purposes of creating and/or modifying an insurance policy. In particular, an onboard device coupled to a vehicle receives GPS signals from which the location of the vehicle may be determined, and one or more geo-fences are activated around pre-determined areas having actuarial significance. The onboard device detects whether the vehicle has crossed the geo-fence boundary (either into a geo-fenced area or out of a geo-fenced area) and a data set of locations associated with the vehicle in relation to geo-fenced areas is created. The insurance company analyzes the data set in order to create and/or modify a personalized insurance policy for the driver. The specification first turns to an illustrative system.

Figure 1:
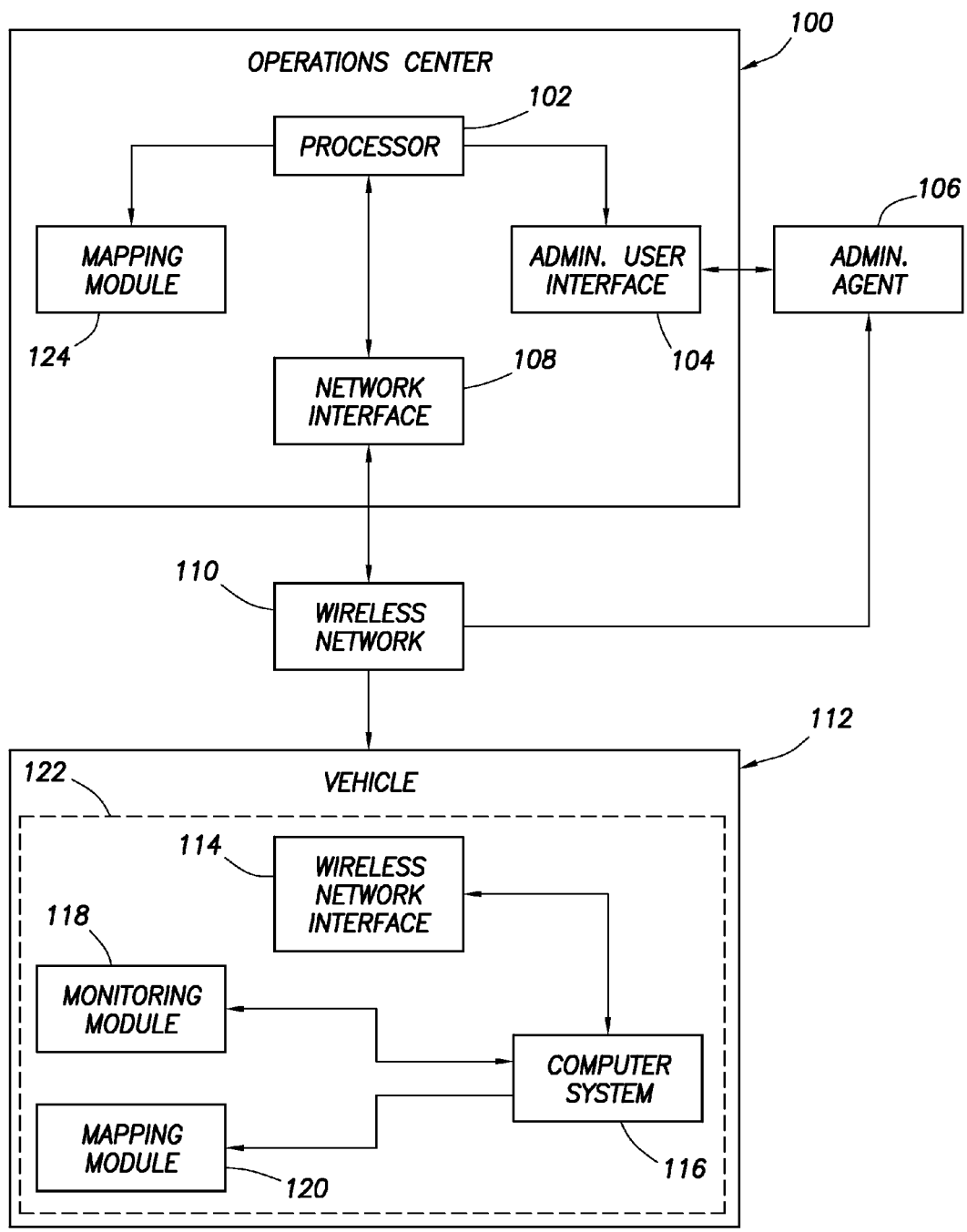
FIG. 1 shows, in block diagram form, a system in accordance with at least some embodiments.

FIG. 1 shows, in block diagram form, a system in accordance with at least some embodiments. In particular, the system comprises an operations center 100 communicatively coupled to a vehicle 112 by way of a wireless network 110. The operations center 100 comprises a processor 102. In some embodiments, the processor 102 may be a stand-alone computer system, or the processor may comprise a plurality of computer systems communicatively coupled and performing the functions of the operations center, the functions discussed more thoroughly below. The processor 102 may couple to an administrative user interface 104. The administrative user interface 104 may enable an administrative agent 106, such as an insurance company employee, to control or configure the operation of the system.

In order to communicate with the vehicle 112, the operations center may further comprise a network interface 108 communicatively coupled to the processor 102. By way of the network interface 108, the processor 102, and any programs executing thereon, may communicate with vehicle 112, such as by wireless network 110. Wireless network 110 is illustrative of any suitable communications network, such as a cellular network, a pager network, or other mechanism for transmitting information between the operations center 100 and the vehicle 112.

In accordance with at least some embodiments, the operations center 100 is remotely located from the vehicle 112. In some cases, the operations center 100 and vehicle 112 may be located within the same city or state. In other cases, the operations center 100 may be many hundreds or thousands of miles from vehicle 112, and thus the illustrative wireless network 110 may span several different types of communication networks.

Still referring to FIG. 1, the system further comprises a vehicle 112 communicatively coupled to operations center 100 by way of the illustrative wireless network 110. In some embodiments, the onboard device may be part of the vehicle 112 as purchased from the manufacturer or dealer. In other embodiments, however, the onboard device may be part of a third-party after-market system. The onboard device 122 coupled to vehicle 112 may further comprise a mapping module 120 coupled to computer system 116. In accordance with at least some embodiments, the mapping module 120 may be a computer program or program package that operates or executes on the computer system 116 to perform a mapping function associated with the location of the vehicle 112 and any geo-fences that may be activated.

The wireless network interface 114 enables the computer system 116 to communicate with operations center 100 by way of a wireless transmission through the wireless network 110. The monitoring module 118 may assist the computer system 116 in determining when the vehicle 112 has crossed into or departed a geo-fenced area, and may also assist the computer system 116 in collecting data regarding movement of the vehicle 112 in relation to an activated geo-fence. Various techniques for activating a geo-fence, as well as monitoring the location of a vehicle, will be discussed more thoroughly below.

The specification now turns to a high level description of monitoring the location of a vehicle and activating a geo-fence for the purposes of establishing personalized insurance policy parameters. In one embodiment, responsive to detection that vehicle 112 is associated with an insurance policy, an onboard device coupled to the vehicle receives Global Positioning System (GPS) signals indicative of the location of the vehicle. The location of the vehicle may be monitored if the vehicle is idle or if the vehicle is in motion. The location of the vehicle is monitored in relation to one or more geo-fences activated around locations having actuarial significance in determining personalized insurance policy parameters. Such parameters might include, but are not limited to, the insurance premium to be paid, the amount of the deductible, the policy limits, or the amount of indemnity. As the location of the vehicle is monitored in relation to these activated geo-fences, the insurance parameters may be adjusted accordingly. The specification now turns to FIG. 2 and to a discussion of geo-fences.

Figure 2:
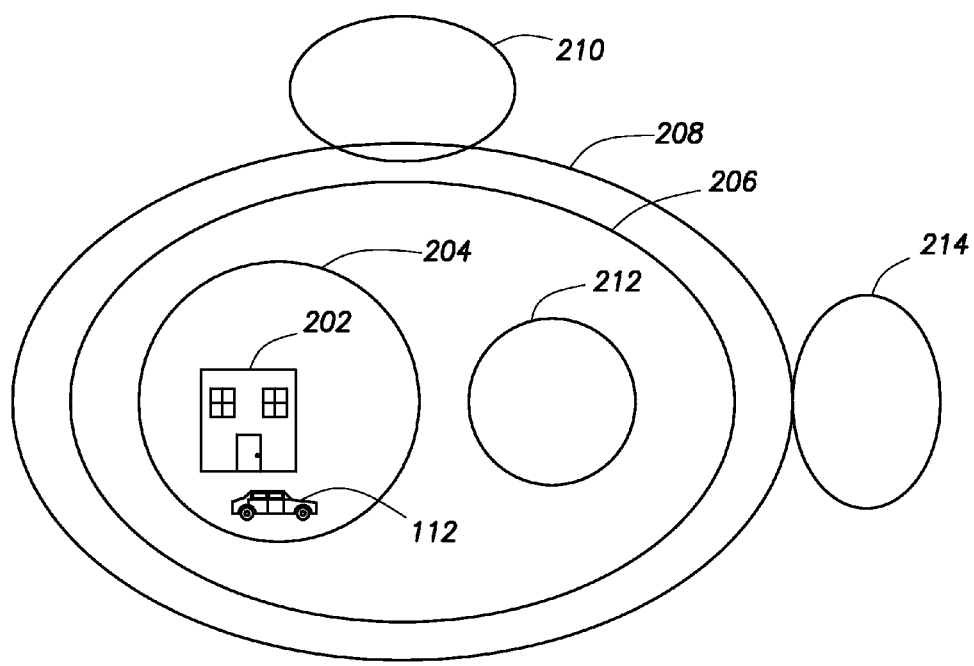
FIG. 2 shows, in block diagram form, a set of geo-fences in accordance with at least some embodiments.

FIG. 2 shows, in block diagram form, a set of geo-fences in accordance with at least some embodiments. In particular, FIG. 2 shows various geo-fences, vehicle 112, and a location 202. In one embodiment, location 202 may be the driver's home or place of employment; however, location 202 is not limited to either a home or a place of employment and may be any location. The plurality of geo-fences, such as those shown in FIG. 2, corresponds to areas of actuarial interest related to the vehicle. In one embodiment, the size, shape, and location of any geo-fence may be initially preconfigured by an administrative agent (e.g., the insurance company) before a vehicle is sold, rented, or otherwise turned over to a driver (e.g., prior to the vehicle being driven). The geo-fence may be preconfigured as a region corresponding to any location of actuarial interest to the insurance company. In one embodiment, the geo-fence may be configured to correspond to the size and shape of a state. In another embodiment, the geo-fence may be configured to correspond to the size and shape of a country. In yet another embodiment, the geo-fence may correspond to another area of interest such as, but not limited to, a neighborhood, a section of road, or any other area.

In some embodiments, a geo-fence may have no locational relationship with any other geo-fence (e.g., they may not overlap, abut, or be within or around another geo-fence); however, in other embodiments, multiple geo-fences may abut one another (such as geo-fences 208 and 214); one or more geo-fences may be nested within another geo-fence (such as geo-fences 204 within 206 within 208); or geo-fences may partially overlap (such as geo-fences 208 and 210).

The plurality of preconfigured geo-fences are uploaded to the onboard device coupled to vehicle 112. The preconfigured geo-fences may be uploaded onto the onboard device at the time the vehicle is associated with an insurance policy. The uploading may be through wireless network 110, or may be through a wired connection such by way of, but not limited to, a USB connection. In some embodiments, however, the insurance company or the driver may want to add additional geo-fences which were not originally uploaded onto the onboard device. In another embodiment, the geo-fences already present on the onboard device may be outdated and require updating. Thus, in order to add or update geo-fence maps stored on the onboard device, a driver or administrative agent (e.g., the insurance company), may download a geo-fence software application onto a handheld wireless device, such as a smart phone, a personal digital assistant, or other wireless device capable of receiving and transmitting wireless signals. The geo-fence software application may then be used to upload new or updated geo-fences to the onboard device wirelessly through the wireless handheld device. In yet another embodiment, the onboard device may be physically removed and updated by way of a wired connection to a computer system, such as by way of a USB connection. Regardless if the geo-fences on the onboard device are new, updated or original, or by the way of which they are uploaded to the onboard device, the geo-fences may be activated and the locations of the vehicle 112 related to the geo-fence are collected.

In one embodiment, the onboard device will automatically activate the geo-fences as soon as they are uploaded to the onboard device. In other words, in this example, the preconfigured geo-fences are automatically activated after being uploaded to the onboard device, and remain activated until cancellation of the insurance policy. In another embodiment, some geo-fences may be automatically activated and deactivated based on the location of the vehicle. For example, the onboard device, without input from an administrative agent or the driver, may active a geo-fence corresponding to the driver's home state of Texas. However, if the driver approaches the border of New Mexico, the onboard device may activate the geo-fence corresponding to the state of New Mexico in anticipation of the vehicle approaching that area of interest. Once the vehicle has passed into New Mexico, the onboard device may deactivate the geo-fence around Texas. Regardless of when a geo-fence is activated, vehicle located in relation to the activated geo-fences is collected. In some embodiments, location information may be of interest for a large area such as the above state of Texas example; however, in other embodiments, the area of interest may be smaller, such as shown in FIG. 3.

Figure 3:
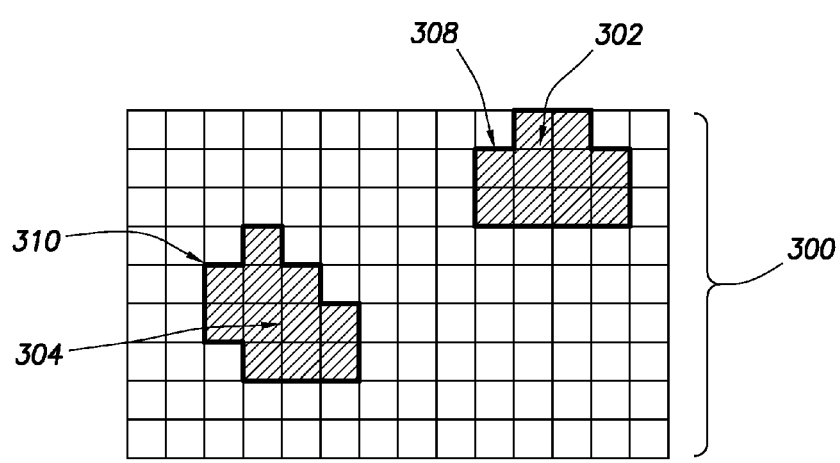
FIG. 3 shows, in block diagram form, established and/or activated geo-fences in accordance with at least some embodiments.

FIG. 3 shows, in block diagram form, example preconfigured and activated geo-fences in accordance with at least some embodiments. In particular, grid 300 represents a geographic area. In this example, grid 300 represents the streets comprising a neighborhood, with each depicted block representing one city block. Two pre-determined areas of interest are shown as shaded sections 302 and 304. Additionally, areas 302 and 324 are shown as bounded by respective geo-fences 308 and 310 (shown by darkened lines).

Geo-fence 310 may be automatically activated around area 304 because area 304 represents an area with a higher or lower actuarial risk, and thus is of interest when determining personalized insurance policy parameters. In particular, in some cases, the risk is higher if a driver crosses into a geo-fenced area. In other cases, the risk is higher if a driver crosses out of a geo-fenced area. In yet other cases, the actuarial risk may be lower for crossing into or out of a geo-fenced area. For example, area 304 might represent a neighborhood with a high crime rate. A vehicle located within a high crime rate area has a greater chance of being subject to vandalism or other illegal activity affecting the insurance policy.

In one embodiment, the onboard device, monitoring the location of the vehicle, collects data related to how much time a vehicle has spent in the geo-fenced area. The data collected may be indicative of whether the vehicle is simply stopped at a red light, whether the vehicle is driving through an area without stopping, or whether the vehicle has been idle or parked for significant period of time. Additionally, the insurance company receiving location data from the onboard device may make a determination as to how frequently a vehicle is located within a specific geo-fenced area such as area 304. For example, data indicative of a vehicle traveling into a high crime geo-fenced area once a month will impact the policy differently than if the vehicle parks within the high crime geo-fenced area daily.

In another embodiment, area 302 may represent a location where traffic is historically voluminous or is an area where there are a large number of reported accidents, such that if the vehicle is frequently located in such a geo-fenced area, the insurance policy parameters may be more costly. In yet another embodiment, the geo-fenced areas may be areas that are considered dangerous to drive through during inclement weather; for example, driving on narrow streets or hilly, curvy roads would present a higher risk during a heavy thunderstorm or snow storm versus driving on those same roads on a dry day. In yet still another embodiment, the insurance company may receive location data from the onboard device regarding the driving behavior of a driver, which may affect the insurance parameters. While these examples describe that insurance parameters can be affected by a vehicle traveling into and located within geo-fenced areas, it is also true that a vehicle traveling out of and located outside geo-fenced areas may also affect the insurance policy parameters.

In one embodiment, the pre-determined areas 302 and 304 may be areas of business operations. For example, a driver for a delivery company may have a route that does not extend beyond the shaded areas of 302 and 304, and the insurance policy on the vehicle may only extend to travel within areas 302 and 304. If an employee using a company car for work travels outside the geo-fenced area 302, the company's insurance policy parameters may be negatively affected, as the vehicle may not be covered, or not as well covered, for travel in locations outside the business area. In another embodiment, where the driver is insured only for travel within a specific country, the geo-fenced area may be the political boundary of that country, such as the political border of the conterminous United States. Thus, the act of a vehicle leaving the geo-fenced United States and driving into Mexico or Canada may change the insurance policy.

In yet another embodiment, information related to the driving habits of the driver may affect the insurance policy. For example, if the vehicle location was monitored as moving at a steady pace over time (as might indicate normal driving), and then two locations are recorded in a short period of time, such data may indicate the driver has suddenly slammed on his brakes. On the other hand, the location data may show that the driver has covered a large distance in a short period of time, thus indicating the possibility of speeding. In yet another embodiment, the location data may indicate the driver is swearing, such as from lane to lane.

Regardless of which area is geo-fenced, and regardless of whether the vehicle is entering the geo-fenced area or departing it, location information related to the vehicle with respect to geo-fenced areas is used to determine personalized insurance policies. By monitoring when, where, and for how long a vehicle is in a specific area, the insurance company can adjust parameters associated with the insurance policy such as, but not limited to, the policy limits, the deductible, premium payments, and indemnity. For example, if a driver lives in a low crime neighborhood and drives to his office, also located in a low crime neighborhood, the insurance company may set his deductible low and premium payments low. In another example, an employer that allows an employee access to a company car for company business within a designated area may pay lower premiums if the vehicle is being used for business purposes within the business area. In contrast, a driver that frequents neighborhoods with a high crime rate, including a high rate of burglaries or other vandalism, may have higher premium payments and/or a higher deductible. In yet another example, a driver may have one indemnity policy for driving within the United States, but have a different indemnity policy when crossing from the United States into Mexico or Canada.

In one embodiment, the onboard device monitors the location of the vehicle and collects vehicle information. In order to discuss the embodiment of the onboard device collecting vehicle location information, the discussion turns briefly to a more detailed description of the monitoring module 118. The monitoring module 118 may comprise, among other possible monitoring systems, a GPS receiver. The Global Position System comprises a plurality of satellites broadcasting very precise timing signals. The GPS receiver within monitoring module 118, receiving a plurality of the timing signals, may determine not only the location of the GPS receiver (and thus, the vehicle 112) but may also establish navigation information, such as speed, direction of travel, miles traveled, and time spent in a location. Thus, GPS receiver receives the timing signals, determines location of the vehicle 112, and passes the location information to computer system 116. Computer system 116 processes the information received from the GPS receiver and monitors the location of the vehicle with respect to the activated geo-fence.

In some embodiments, the GPS receiver alone may track the location of the vehicle in relation to a geo-fence, where in other cases the GPS receiver may work in conjunction with the computer system 116 to track the location of the vehicle. For example, the computer system 116 may receive real-time transmission of location information from the GPS receiver, and then create a data set which comprises the vehicle's locational information.

In another embodiment, the operations center 100 may play a role in creating the data set of location information. In particular, processor 102 may receive real-time transmissions from the onboard device 122 indicative of the vehicle's location. In particular, as the onboard device 122 receives signals indicative of the vehicle's location from the GPS, the onboard device passes each location datum to the operations center in real-time as each datum is received by the onboard device. Operations center 100 may also comprise a mapping module 124. The mapping module 124 may determine the location of the vehicle based on the location data received from the onboard device, and may determine if a vehicle has passed out of or entered into a geo-fenced area. The operations center may collect data, creating a data set, and then send the data set to the administrative agent (e.g. the insurance agent).

Regardless of the method by which data related to the location of the vehicle is monitored, collected, and transmitted, the data collected corresponding to the vehicle location is provided to the insurance company. In one embodiment, the onboard device receives indications of the vehicle's location from the GPS and sends each indication of location to the operations center in real-time. In this embodiment, it is the operations center that creates the data set. In another embodiment, the onboard device collects data related to the location of the vehicle from the GPS storing it in memory, and periodically transmits it to the operations center. The periodic transmissions may be on the order of every few minutes, hours, or days or more. In some embodiments, such as shown in FIG. 1, onboard device comprising the wireless network interface 114, computer system 116, mapping module 120, and monitoring module 118 may be part of the vehicle 112 as purchased from the manufacturer or dealer, and is shown within dotted line 122. However, in other embodiments, the wireless network interface, computer system, and monitoring system may be part of a third-party after-market onboard device system 122, such as is shown in FIG. 4.

Figure 4:
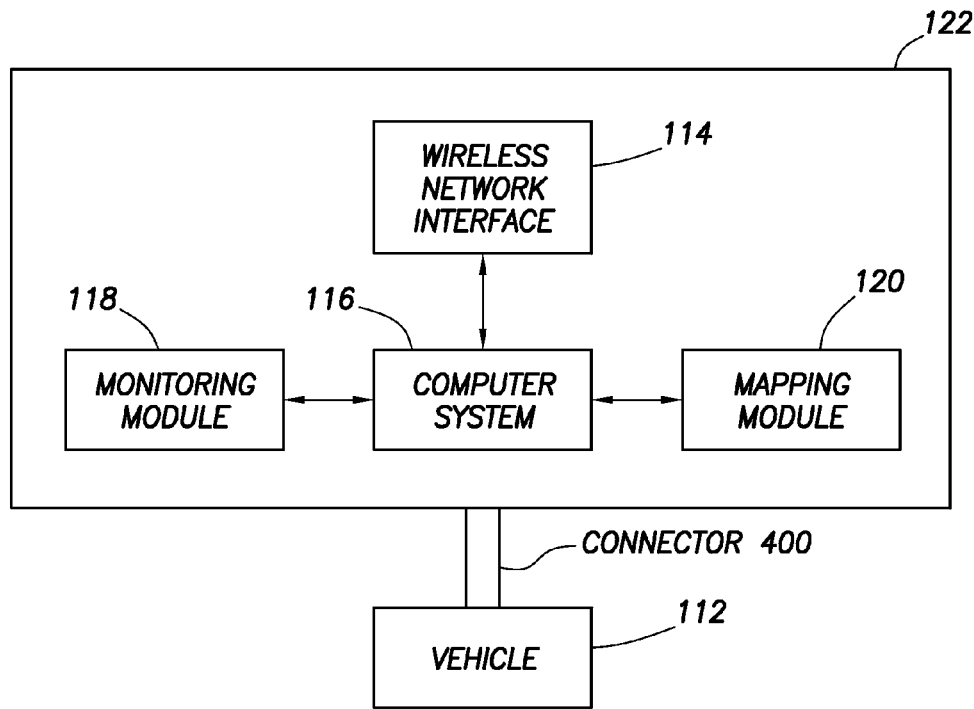
FIG. 4 shows, in block diagram form, an after-market system connected to a vehicle in accordance with at least some embodiments.

In particular, FIG. 4 shows, in block diagram form, after-market system 122 coupled to vehicle 112 by way of an electrical connector 400. In some embodiments, the after-market system 122 may be mechanically coupled to the inside of a vehicle 112, such as within the dashboard. In other embodiments, the after-market system 122 may be coupled at any suitable location, such as within the engine compartment, or in the trunk, and may be able to be disconnected by a driver or administrative agent for purposes of downloading location information for transfer to an insurance company. In one embodiment, the onboard device may be disconnected from the vehicle (by a driver or an administrative agent) for the purpose of downloading the location data set to a computer for analysis by the insurance company. For example, the location data set may be downloaded from the onboard device to a computer system by way of a wired connection, such as a USB cable, to a computer residing at the insurance company. In another embodiment, the driver may disconnect the onboard device and connect it to his own personal computer by way of a wired connection, and then transmit the location data set to the insurance company by way of a wireless transmission, such as by e-mail or via the Internet.

Figure 5:
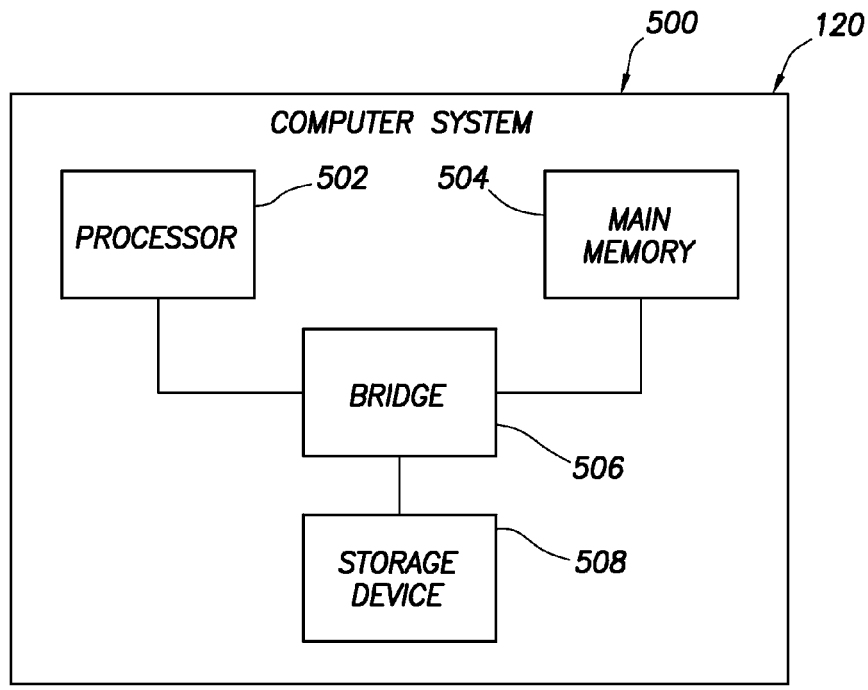
FIG. 5 shows, in block diagram form, a computer system in accordance with at least some embodiments.

FIG. 5 shows a computer system 500, which is illustrative of a computer system upon which the various embodiments may be practiced. The computer system 500 may be illustrative of, for example, computer system 116 coupled to the vehicle 112. In another embodiment, computer system 500 may be illustrative of processor 102. The computer system 500 comprises a processor 502, and the processor couples to a main memory 504 by way of a bridge device 506. Moreover, the processor 502 may couple to a long term storage device 508 (e.g., a hard drive, solid state disk, memory stick, optical disc) by way of the bridge device 506. Programs executable by the processor 502 may be stored on the storage device 508, and accessed when needed by the processor 502. The program stored on the storage device 508 may comprise programs to implement the various embodiments of the present specification, such as activating a geo-fence or detecting the vehicle has crossed the geo-fence, as well as creating a data set related to the location of the vehicle with respect to the geo-fence. In some cases, the programs are copied from the storage device 508 to the main memory 504, and the programs are executed from the main memory 504. Thus, the main memory 504, and storage device 508 shall be considered computer-readable storage mediums.

Figure 6:
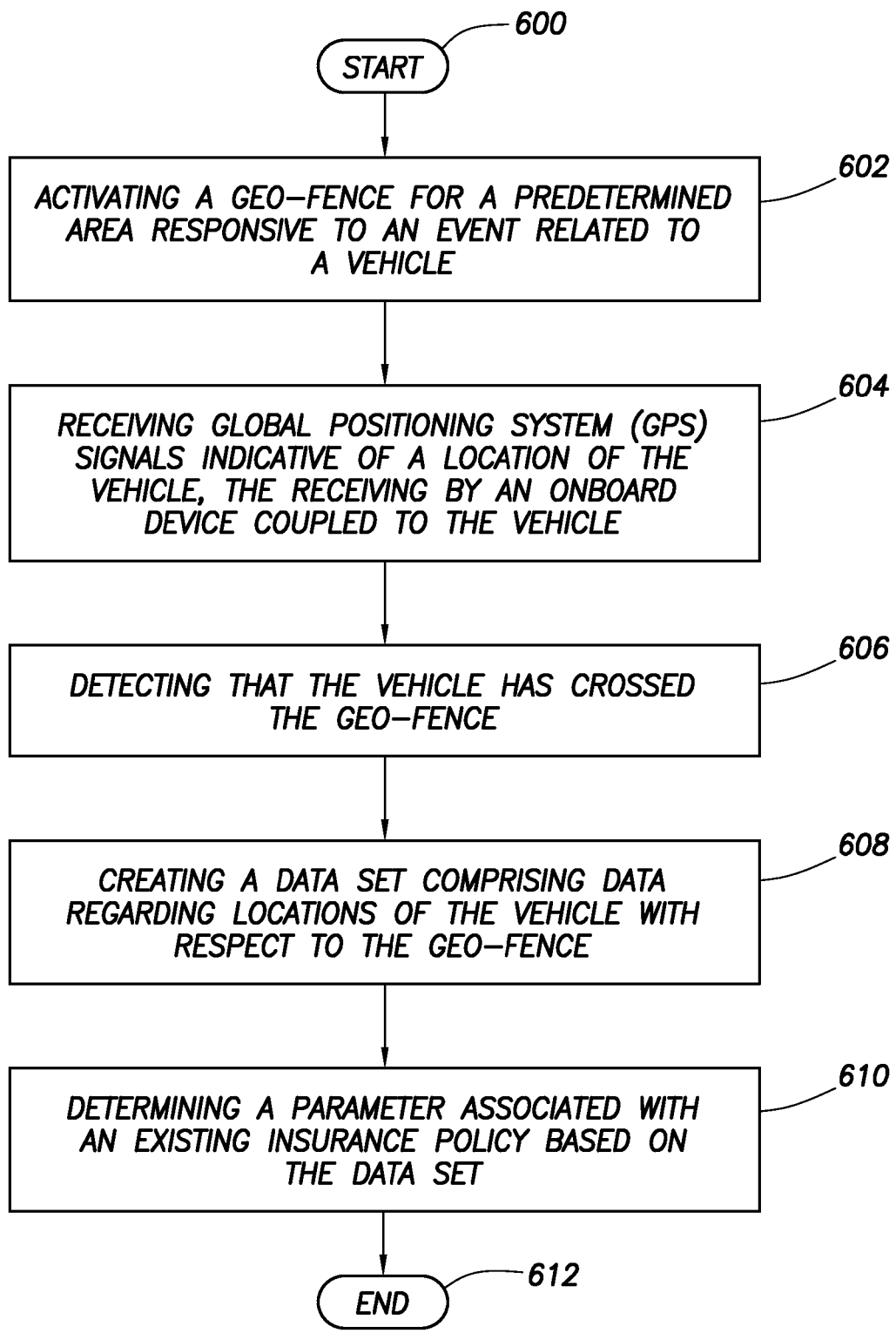
FIG. 6 shows, in block diagram form, a method in accordance with at least some embodiments.

The method of monitoring a vehicle's location with respect to an activated geo-fence for insurance purposes will now be discussed in more detail. FIG. 6 shows a flow diagram depicting an overall method of monitoring a vehicle's location with respect to an activated geo-fence for insurance purposes. The method starts (block 600), and moves to activating a geo-fence for a pre-determined area responsive to an event related to a vehicle (block 602). The method then moves to receiving global positioning system (GPS) signals indicative of a location of the vehicle, the receiving by an onboard device coupled to the vehicle (block 604). The method then moves to detecting that the vehicle has crossed the geo-fence, (block 606), creating a data set comprising data regarding locations of the vehicle with respect to the geo-fence (block 608) and then determining a parameter associated with an existing insurance policy based on the data set (block 610). Thereafter, the method ends (block 612).

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the various embodiments have been described in terms of monitoring the location of a vehicle with respect to a geo-fence in order to determine insurance parameters. This context, however, shall not be read as a limitation as to the scope of one or more of the embodiments described—the same techniques may be used for other embodiments. It is intended that the following claims be interpreted to embrace all such variations and modifications.

What is claimed is:

1. A method comprising:
    activating a geo-fence for a pre-determined area responsive to an event related to a vehicle;
    receiving Global Positioning System (GPS) signals indicative of a location of the vehicle, the receiving by an onboard device coupled to the vehicle;
    detecting that the vehicle has crossed the geo-fence;
    creating a data set comprising data regarding locations of the vehicle with respect to the geo-fence; and
    determining a parameter associated with an existing insurance policy based on the data set.

2. The method of claim 1 further comprising, prior to activating the geo-fence, establishing the geo-fence for the pre-determined area based on an area of actuarial interest.

3. The method of claim 1 where creating the data set further comprising:
    determining a plurality of locations of the vehicle by the onboard device over a period of time; and then
    sending the data set to a remote operations center, the sending by way of a wireless transmission.

4. The method of claim 1 wherein creating the data set further comprises:
determining a plurality of locations of the vehicle by the onboard device;
sending by the onboard an indication of location to a remote operations center, the sending in real-time with each location determination; and
creating the data set at the remote operations center.

5. The method of claim 1 wherein activating further comprises activating the geo-fence for a pre-determined area responsive to purchasing an insurance policy.

6. The method of claim 1 wherein activating the geo-fence for the pre-determined area further comprises activating at least one selected from the group consisting of: a geo-fence corresponding to the size and shape of a city boundary; a geo-fence corresponding to the size and shape of a state boundary; a geo-fence corresponding to the size and shape of a country boundary; a geo-fence corresponding to the size and shape of an area with a high crime rate; a geo-fence corresponding to the size and shape of an area with a high volume of traffic; and a geo-fence corresponding to the size and shape of an area of business.

7. The method of claim 1 further comprising loading an indication of the pre-determined area onto the onboard device, the loading by way of a wireless transmission from a wireless portable device.

8. The method of claim 1 wherein activating further comprises activating multiple non-overlapping geo-fences.

9. The method of claim 1 wherein activating further comprises activating a smaller geo-fence within a larger geo-fence.

10. The method of claim 1:
wherein the geo-fence is a first geo-fence; and
activating further comprises activating a second geo-fence that at least partially overlaps the first geo-fence.

11. The method of claim 1 wherein detecting further comprises detecting the vehicle has at least one selected from the group consisting of: crossed out of an area bounded by the geo-fence; and crossed into the area bounded by the geo-fence.

12. The method of claim 1 wherein determining further comprises changing the parameter associated with insurance based on whether the vehicle has crossed the geo-fence.

13. The method of claim 11 wherein changing the parameter associated with insurance is based on at least one selected from the group consisting of: changing a deductible; changing an insurance premium; changing policy limits; and changing an indemnity agreement.

14. A system comprising:
an onboard device coupled to a vehicle comprising:
a processor;
a wireless interface coupled to the processor;
a memory coupled to the processor, the memory storing a program that, when executed by the processor, causes the processor to:
activate a geo-fence for a pre-determined area responsive to receiving an indication of a purchase of an insurance policy for the vehicle;
receive Global Positioning System (GPS) signals indicative of the location of the vehicle;
detect that the vehicle has crossed the geo-fence; and
create a plurality of indications of location of the vehicle with respect to the geo-fence.

15. The system of claim 14 wherein the program further causes the processor to create a data set comprising the plurality of indications of location.

16. The system of claim 14 wherein the program further causes the processor to:
create a data set comprising the plurality of indications of locations of the vehicle with respect to the geo-fence; and then
send the data set to a remote operations center, the sending by way of a wireless transmission.

17. The system of claim 14 wherein the program further causes the processor to send each indication of location to a remote operations center in real-time with the creation of each indication of location.

18. The system of claim 14 wherein when the processor activates the geo-fence, the program further causes the processor to activate at least one selected from the group consisting of: a geo-fence corresponding to the size and shape of a city boundary; a geo-fence corresponding to the size and shape of a state boundary; a geo-fence corresponding to the size and shape of a country boundary; a geo-fence corresponding to the size and shape of an area with a high crime rate; a geo-fence corresponding to the size and shape of an area with a high volume of traffic; and a geo-fence corresponding to the size and shape of an area of business.

19. The system of claim 14 wherein the program further causes the processor to receive an indication of coordinates of a new pre-determined area onto the onboard device, the receiving by way of a wireless transmission from a wireless portable device.

20. The system of claim 14 wherein when the processor detects, the program further causes the processor to detect the vehicle has at least one selected from the group consisting of: crossed out of an area bounded by the geo-fence; and crossed into the area bounded by the geo-fence.

21. A system comprising:
a processor;
a wireless interface coupled to the processor;
a memory coupled to the processor, the memory storing a program that, when executed by the processor, causes the processor to:
receive indications of location of a vehicle from an onboard device coupled to the vehicle, the indications of location with respect to a geo-fence; and
change a parameter associated with an existing insurance policy associated with the vehicle, the change based on the indications of location.

22. The system of claim 21 wherein when the processor receives, the program further causes the processor to receive a data set comprising a plurality of indications of location of the vehicle.

23. The system of claim 21 wherein when the processor receives, the program further causes the processor to create a data set of locations of the vehicle by receiving a plurality of indications of location, each indication of location received in real-time with creation of the indication at the onboard device.

24. The system of claim 21 wherein the program further causes the processor to:
activate a geo-fence for a pre-determined area responsive to receiving an indication of a purchase of the insurance policy;
detect that the vehicle has crossed the geo-fence; and
create a data set comprising data regarding locations of the vehicle with respect to the geo-fence.

25. The system of claim 21 wherein when the processor activates the geo-fence, the program further causes the processor to activates at least one selected from the group consisting of: a geo-fence corresponding to the size and shape of a city boundary; a geo-fence corresponding to the size and shape of a state boundary; a geo-fence corresponding to the size and shape of a country boundary; a geo-fence corresponding to the size and shape of an area with a high crime rate; a geo-fence corresponding to the size and shape of an area with a high volume of traffic; and a geo-fence corresponding to the size and shape of an area of business.

26. The system of claim 21 wherein when the processor detects, the program further causes the processor to detect that the vehicle has at least one selected from the group consisting of: crossed out of an area bounded by the geo-fence; and crossed into the area bounded by the geo-fence.

* * * * *